N. BRAND.
Hay Tedder.
No. 87,392.
Patented March 2, 1869.
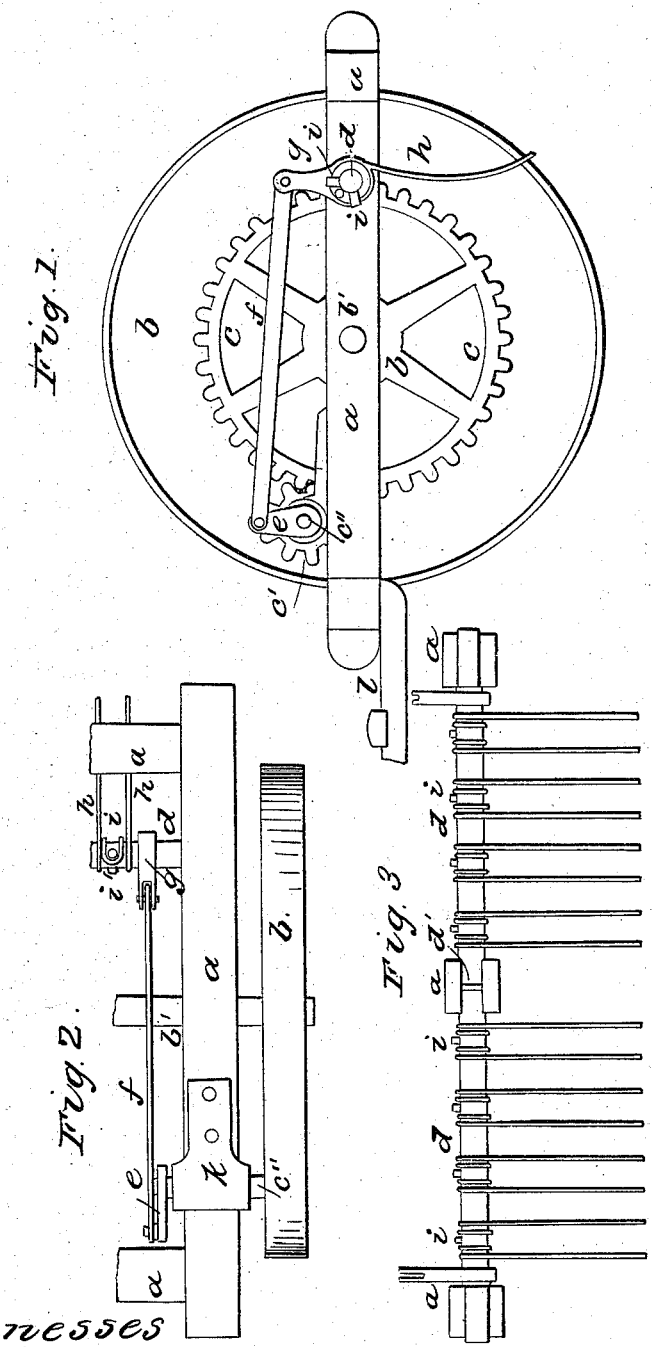

NATHAN BRAND, OF ILION, NEW YORK.

Letters Patent No. 87,392, dated March 2, 1869.

IMPROVEMENT IN HAY-SPREADERS.

The Schedule referred to in these Letters Patent and making part of the same.

*To all whom it may concern:*

Be it known that I, NATHAN BRAND, of Ilion, Herkimer county, New York, have invented a new and improved Machine for Spreading Hay; and I do hereby declare that the following is a full and exact description thereof, reference being had to the accompanying drawings, and to the letters of reference marked thereon.

Similar letters of reference indicate the same devices in all the figures.

To enable others skilled in the arts to comprehend, make, and use my invention, I will proceed to describe its nature, construction, and operation.

The nature of my invention consists in the employment of tines for spreading hay, which are attached to and swing upon a rock-shaft with a limited motion, receiving their backward and forward movement for spreading from the wheels of the machine, through the rock-shaft, connecting-rod, crank, and gears.

Figure 1 is a vertical section of my spreader.
Figure 2 is a top view of a portion of the same.
Figure 3 is an elevation of the rock-shafts and tines.
a, frame.
b, wheel.
b', axle.
c, gear, making a part of the wheel.
c', pinion on shaft c''.
d, rock-shaft.
e, crank on shaft c''.
f, connecting-rod between crank e and arm g of the rock-shaft.
h, tines.
i and i', pins which limit the swinging movement of the tines upon the rock-shaft.
k, stand which supports the pinion c' and shaft c''.
l, thills.

I employ two rock-shafts in my spreader, each being connected with the wheel on the same side of the machine, the rock-shaft and wheel on one side of the machine moving entirely independent of the shaft and wheel on the other side, so that in turning around, or moving on a curve, the tines are worked in proportion to the distance the machine travels.

The tines are made in pairs. Each pair consists of a single rod of steel or iron, and are made, as shown in figs. 2 and 3, by being wound once around the rock-shaft, in one direction, then bent around the pin i, and wound once more around the rock-shaft, in the opposite direction, the two free ends of the rod being suitably curved to form tines for spreading hay.

These tines swing loosely upon the rock-shaft, their motions on the shaft being limited by the pins i and i'. This facilitates the movement of the tines forward over the hay, their weight depressing them sufficiently to cause them to catch the hay when they receive a backward movement from the rock-shaft.

The operation of my spreader is as follows:

As the wheels roll along upon the ground, the gear c gives motion to pinion c', crank e, and connecting-rod f, which, in turn, communicates its motion to the rock-shaft and tines, through arm g, by which means the tines receive a rapid backward and forward movement. Being curved backward, and, to a certain extent, loose upon the rock-shaft, they do not catch the hay during their forward movement, but seize it and throw it backward and upward with great force, by their backward movement.

The rock-shaft may be lengthened sufficiently to extend outside of the wheels, if desired, so as to spread the hay after the wheels have passed over it.

I have here described the tines as attached to and swinging upon the rock-shaft, but they may be attached to and swinging upon a bar suspended, by means of arms, from the rock-shaft, said bar taking a backward and forward movement from the shaft.

Having described my invention,

What I desire to have secured to me by Letters Patent of the United States, is—

The combination and arrangement of pinion c', crank e, arm g, with the rock-shafts d d, operated separately or together, substantially as set forth and described.

NATHAN BRAND.

Witnesses:
W. H. ELLIOT,
J. B. PELTON.